(12) United States Patent  (10) Patent No.: US 12,450,170 B2
Beaumont  (45) Date of Patent: Oct. 21, 2025

(54) CONFIGURABLE CACHE REPLACEMENT

(71) Applicant: Advanced Micro Devices, Inc., Santa Clara, CA (US)

(72) Inventor: Ian Richard Beaumont, Sydney (AU)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/476,371

(22) Filed: Sep. 28, 2023

(65) Prior Publication Data

US 2025/0110895 A1 Apr. 3, 2025

(51) Int. Cl.
*G06F 12/122* (2016.01)
(52) U.S. Cl.
CPC ................................ *G06F 12/122* (2013.01)
(58) Field of Classification Search
CPC ........................................................ G06F 3/06
See application file for complete search history.

(56) References Cited

U.S. PATENT DOCUMENTS

| 9,323,771 | B2* | 4/2016 | Krishnamurthy | G06F 16/162 |
| 2007/0186046 | A1* | 8/2007 | Irish | G06F 12/123 |
| | | | | 711/E12.075 |
| 2009/0204767 | A1* | 8/2009 | Hutton | G06F 12/0864 |
| | | | | 711/136 |
| 2011/0078133 | A1* | 3/2011 | Bordawekar | G06F 16/90335 |
| | | | | 707/E17.014 |
| 2013/0311724 | A1* | 11/2013 | Walker | G06F 12/0811 |
| | | | | 711/E12.071 |
| 2018/0095875 | A1* | 4/2018 | Zhang | G06F 12/0864 |
| 2019/0004974 | A1* | 1/2019 | Chhabra | G06F 12/0846 |
| 2021/0089580 | A1* | 3/2021 | Deng | G06F 16/288 |
| 2025/0103496 | A1* | 3/2025 | Granovsky | G06F 12/0891 |

\* cited by examiner

*Primary Examiner* — Stephanie Wu
(74) *Attorney, Agent, or Firm* — Greenberg Traurig, LLP

(57) ABSTRACT

The disclosed device includes a cache organized by sets and ways and a control circuit that selects a first way for a cache replacement from a first half of a set of ways. The control circuit also selects another way from a second half of the set of ways, and uses the second way for the cache replacement when the first way is unavailable. Various other methods, systems, and computer-readable media are also disclosed.

20 Claims, 9 Drawing Sheets

202

203

302

303

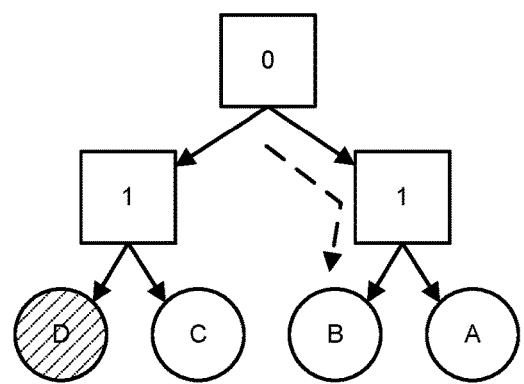
FIG. 4D
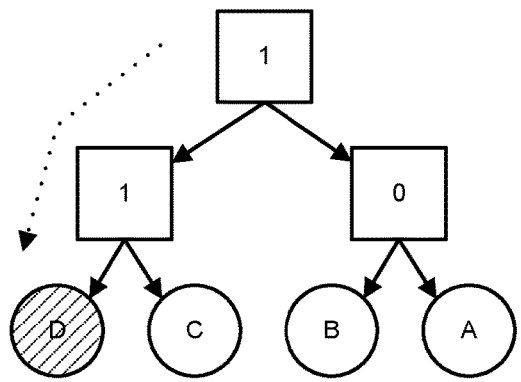 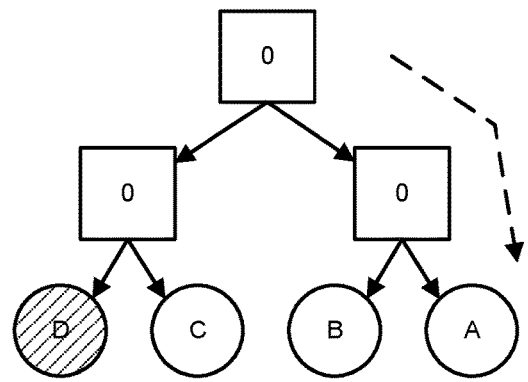
FIG. 4E                             FIG. 4F

CONFIGURABLE CACHE REPLACEMENT

BACKGROUND

Cache systems are often organized into sets and ways to store data. For example, addresses are mapped to sets, each set includes a number of ways, and each way corresponds to a cache line. During a cache replacement operation, a cache controller selects a particular way (e.g., cache line) to be replaced by a new cache entry. Although in many cases a least-recently used (LRU) way would be an ideal selection, cache systems often utilize a pseudo LRU (PLRU) cache replacement scheme using a binary tree mapped to the ways. A PLRU cache replacement scheme can provide a good tradeoff between speed (e.g., using hardware circuits that can take advantage of the binary tree structure) and accuracy, as a true LRU way is not always selected. However, if the number of ways is not a power of two, the PLRU cache replacement scheme can be sub-optimal.

BRIEF DESCRIPTION OF THE DRAWINGS

The accompanying drawings illustrate a number of exemplary implementations and are a part of the specification. Together with the following description, these drawings demonstrate and explain various principles of the present disclosure.

FIGS. 4A-F are tree diagrams of an exemplary configurable PLRU cache replacement scheme with a reduced number of ways.

Figure 1:
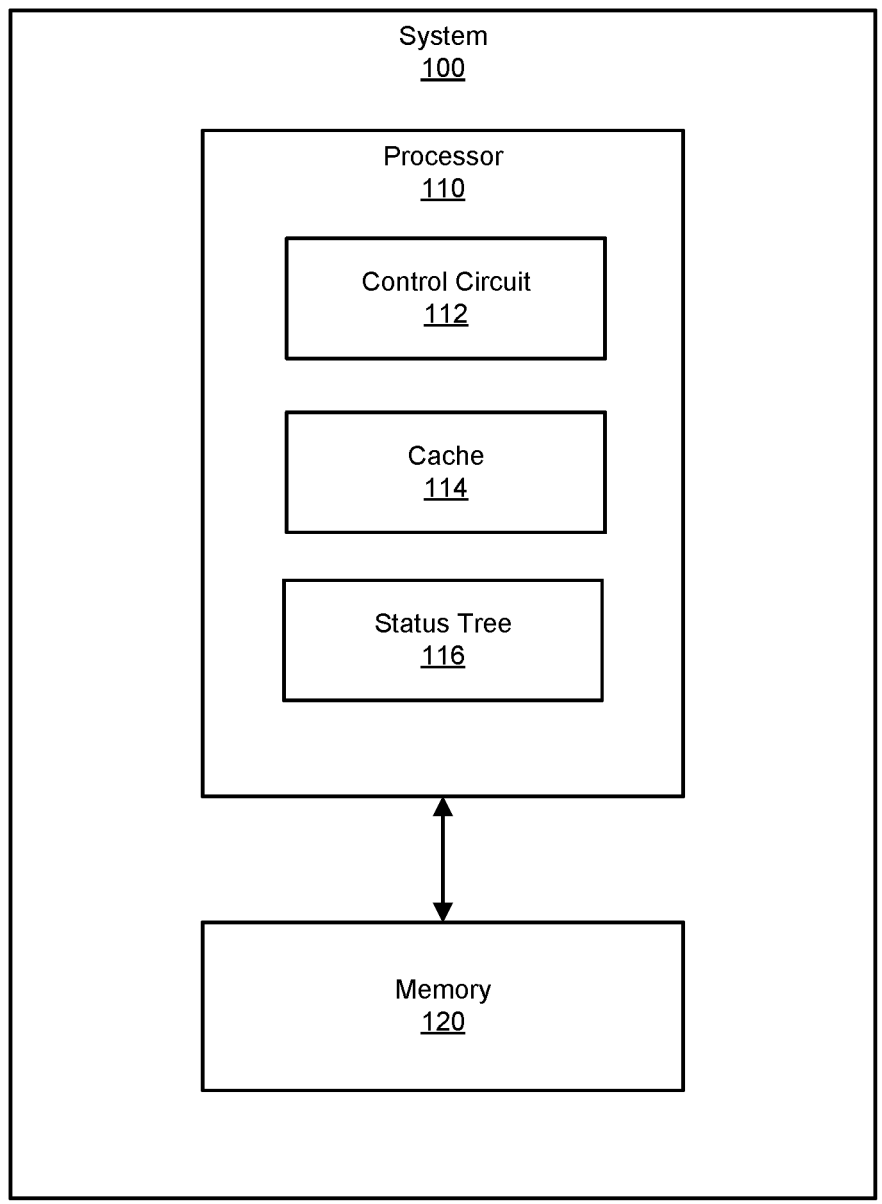
FIG. 1 is a block diagram of an exemplary system for a configurable cache replacement scheme.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to a configurable cache replacement scheme. As will be explained in greater detail below, implementations of the present disclosure select, for a cache replacement, a first way from a first half of a set of ways and a second way from a second half of the set of ways using a status tree. The status tree can correspond to a cache replacement scheme, such as a binary tree for a PLRU cache replacement scheme. If the first way is unavailable, the second way is used for the cache replacement. The systems and methods described herein allows for cache reconfiguration (e.g., reserving certain ways for other uses, rendering them unavailable in a normal cache replacement) by providing one or more circuits that can implement a flexible, configurable cache replacement scheme that can advantageously maintain a relatively balanced distribution of cache replacements amongst the available ways.

In one implementation, a device for a configurable cache replacement scheme includes a control circuit configured to select, based on a status tree for a set of ways, a first way for a cache replacement from a first half of the set of ways, and select, based on the status tree and in response to the first way being unavailable for selection, a second way for the cache replacement from a second half of the set of ways.

In some examples, the control circuit is further configured to select the first way and select the second way by decoding the status tree. The status tree can correspond to a binary tree for a pseudo least-recently used replacement scheme having status bits indicating which half of a level of the binary tree includes a pseudo least recently used way. In some examples, decoding the status tree further includes decoding the status tree for the first half while decoding status tree for the second half.

In some examples, the first half is determined from a status bit of a highest available level of the binary tree and the second half is opposite the first half. In some examples, the highest available level is based on a number of available ways in the set of ways. In some examples, decoding the status tree further comprises decoding a sub-portion of the binary tree starting from the highest available level.

In some examples, the control circuit is further configured to update the status tree for the first half after selecting the first way. In some examples, updating the status tree after selecting the first way includes updating the status tree to point away from the first way.

In some examples, the control circuit is further configured to update the status tree for the second half after selecting the second way. In some examples, updating the status tree after selecting the second way includes updating the status tree to point away from the second way.

In one implementation, a system for a configurable cache replacement scheme includes a cache having a set of ways mapped to a status tree. The set of ways can include at least one unavailable way that is unavailable for selection in a cache replacement scheme. The system can also include a control circuit configured to (i) select, based on the status tree, a first way for a cache replacement from a first half of the set of ways, (ii) update the status tree to point away from the first way, and (iii) select, in response to the first way being unavailable for selection, a second way for the cache replacement from a second half of the set of ways opposite the first half.

In some examples, the control circuit is further configured to select the first way and select the second way by decoding the status tree for the first half while decoding the status tree for the second half. The status tree can correspond to a binary tree for a pseudo least-recently used (PLRU) replacement scheme having status bits indicating which half of a level of the binary tree includes a pseudo least recently used way.

In some examples, the first half is determined from a status bit of a highest available level of the binary tree. In some examples, the highest available level is based on a number of unavailable ways in the set of ways. In some examples, decoding the status tree further includes decoding a sub-portion of the binary tree starting from the highest available level. In some examples, the control circuit is further configured to update, after selecting the second way, the status tree for the second half to point away from the second way.

In one implementation, a method for a configurable cache replacement scheme includes (i) searching a first half of a status tree corresponding to a set of ways of a cache to find a first way from the set of ways for a cache replacement, wherein the status tree indicates a pseudo least recently used way is in the first half, (ii) searching a second half of the status tree to find a second way from the set of ways, and (iii) selecting, in response to the first way being unavailable for selection for the cache replacement, the second way for the cache replacement.

In some examples, the method includes searching the second half while searching the first half. In some examples, searching the first half includes searching a half of a sub-portion of the status tree. In some examples, searching the second half includes searching an opposite half of the sub-portion of the status tree. In some examples, the sub-portion of the status tree is based on a number of available ways in the set of ways.

In some examples, the method further includes updating the status tree to point away from the first way, and updating the status tree to point away from the second way.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-6, detailed descriptions of a configurable cache replacement scheme. Detailed descriptions of example systems will be provided in connection with FIG. 1. Detailed descriptions of example cache replacement schemes will be provided in connection with FIGS. 2A-5B. Detailed descriptions of corresponding methods will also be provided in connection with FIG. 6.

FIG. 1 is a block diagram of an example system 100 for a configurable cache replacement scheme. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, chiplets (e.g., smaller and in some examples more specialized processing units that can coordinate as a single chip), microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, portions of one or more of the same, variations or combinations of one or more of the same, and/or any other suitable physical processor.

As further illustrated in FIG. 1, processor 110 includes a control circuit 112, a cache 114, and a status tree 116. Control circuit 112 corresponds to circuitry and/or instructions for a configurable cache replacement scheme for cache 114, and in some examples corresponds to and/or is integrated with a cache controller of cache 114. Cache 114 corresponds to fast on-die memory for processor 110 for temporarily holding data to reduce expensive memory accesses to memory 120 and in some examples can be part of a cache hierarchy (e.g., having multiple levels of cache storages). When cache 114 is full (e.g., each usable way in a corresponding set for a given context has data), any new data to be stored in cache 114 (e.g., in response to a cache miss) requires evicting an entry. Control circuit 112 can implement a cache replacement policy or scheme that prioritizes evicting older and/or oldest entries. Status tree 116 corresponds to a tree structure, such as a binary tree, that can be mapped to ways of one or more sets of cache 114 in accordance with a cache replacement scheme, as will be described further below.

Although FIG. 1 illustrates status tree 116, in some examples, status tree 116 can be stored as data (e.g., in registers and/or flops of processor 110, in a portion of cache 114 and/or control circuit 112, etc.). In some implementations, control circuit 112 can efficiently search and/or traverse status tree 116 to find a specific way as indicated by status bits in status tree 116 in accordance with a cache replacement scheme.

FIGS. 2A-2D illustrate various trees 200-203, respectively, in accordance with a PLRU cache replacement scheme. Although an LRU cache replacement scheme can always use the oldest way for cache replacement, in some examples, implementing the LRU cache replacement scheme can require complex and/or expensive circuitry (e.g., for maintaining and looking up exact age values of each entry). A PLRU cache replacement scheme can maintain approximate age values using binary search trees that can be more cost effective to implement.

Each of trees 200-203 can correspond to instances of status tree 116 that can be searched by control circuit 112. Trees 200-203 can correspond to a particular set of cache 114, and each leaf of trees 200-203 can be mapped to specific ways of cache 114 (e.g., labeled A-D for easy reference, although in some implementations status tree 116 and/or control circuit 112 can use any appropriate mapping for ways). Nodes of trees 200-203, including root nodes, include status bits (e.g., 0 or 1) indicating which half or branch from that particular node includes a pseudo least-recently used way. For example, a "0" can indicate that the right half or branch (e.g., with respect to the diagrams in FIGS. 2A-2D) includes the PLRU way, and a "1" can indicate that the left half or branch includes the PLRU way, although in other implementations other designations can be used. The status bits of trees 200-203 can be stored as status tree 116 in any appropriate configuration and/or sequence (e.g., as a sequence of bits by flattening the tree structure). Accordingly, each of trees 200-203 can correspond to various states of status tree 116 as updated over successive cache replacement operations. For the purposes of simplified discussion herein, control circuit 112 can be described as traversing and/or searching a tree, although in some implementations, control circuit 112 can be reading certain elements of status tree 116 in a certain sequence, for instance based on read status bit values. Additionally, status tree 116 can represent a binary tree which in some implementations can be stored as a vector, bit sequence and/or other data structure. More specifically, in some examples, control circuit 112, can traverse and/or search the tree by decoding status tree 116 and can include circuitry for efficiently decoding one or both halves of status tree 116.

Figure 2A:
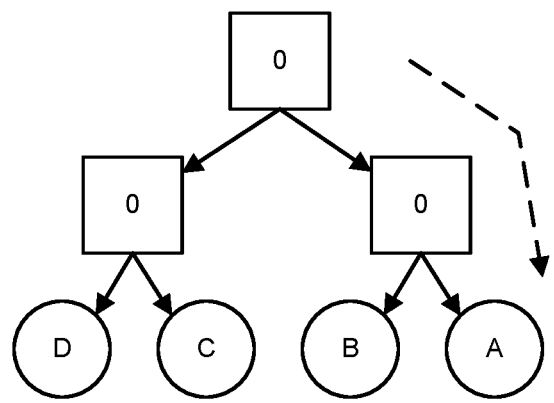
FIGS. 2A-D are tree diagrams of an exemplary pseudo least-recently used (PLRU) cache replacement scheme.

In FIG. 2A, tree 200 can correspond to a reset or initial state in which all status bits are zero, although in other examples tree 200 can reach this state over a normal course of updates. When control circuit 112 traverses tree 200 to find a PLRU way (e.g., to use the PLRU way for a cache replacement operation) control circuit 112 can begin at a root node to search half of tree 200, which having value "0" indicates the right half includes the PLRU way (as partially indicated by the dashed arrow). At a next level node, a value "0" indicates the right half includes the PLRU way (as indicated by the dashed arrow). Thus, the status bits indicate way "A" as the PLRU way.

Control circuit 112 can accordingly use way "A" for the cache replacement operation. Control circuit 112 can further update status tree 116 to point to a next PLRU way for a next cache replacement operation. With respect to tree 200, control circuit 112 can update tree 200 by flipping the status bits of traversed nodes in any appropriate manner. For example, control circuit 112 can flip a bit as it is read, can traverse tree 200 in a reverse manner to flip bits, etc. After control circuit 112 updates tree 200, the traversed nodes have been flipped (e.g., to each read "1") as reflected by tree 201 in FIG. 2B.

Figure 2B:
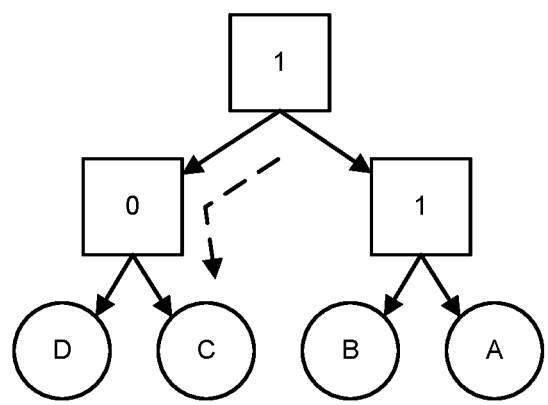

In FIG. 2B, to select a way for a next cache replacement operation, control circuit 112 can search tree 201. Starting at the root node, control circuit 112 can search a left half of tree 201, as indicated by the "1" value at the root node. At a next level node, the "0" value indicates the right half or branch, thus pointing to way "C" as the PLRU way (as indicated by the dashed arrow). Control circuit 112 can update tree 201 by flipping the traversed nodes (e.g., the root node to "0" and the next level node to "1") as reflected by tree 202 in FIG. 2C.

Figure 2C:
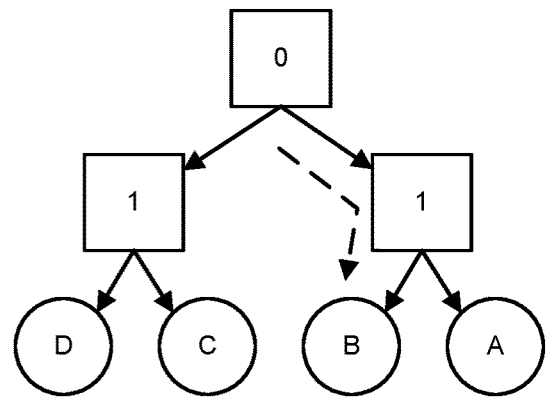

Continuing on to FIG. 2C, control circuit 112 can traverse tree 202 to find and select way "B" as the PLRU way for a next cache replacement operation following the status bits (e.g., the right half from the root node based on "0," and the left half at the next level node based on "1," as indicated by the dashed arrow). Control circuit 112 can accordingly update the status bits of tree 202 (e.g., the root node to "1" and the next level node to "0"), resulting in tree 203 in FIG. 2D.

Figure 2D:
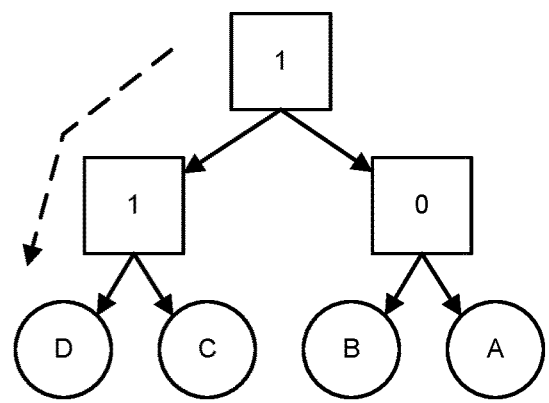

In FIG. 2D, control circuit 112 can traverse tree 203 (e.g., left at the root node based on "1," and left at the next level node based on "1," as indicated by the dashed arrow) to select way "D" as the PLRU way for a cache replacement operation. Control circuit 112 can update the status bits of traversed nodes in tree 203, which can result in status bits similar to tree 200 in FIG. 2A (e.g., flipping the root node to "0" and the next level node to "0"). Thus, control circuit 112 can accordingly search/traverse and update status tree 116.

FIGS. 2A-2D (as well as the other tree sequences described herein) illustrate a simplified example access sequence for updating status tree 116 (e.g., updating at each cache replacement operation such as for a cache miss) for the purposes of explaining how status tree 116 can be updated. However, in other examples, control circuit 112 can update status tree 116 at other accesses (e.g., read/load, write/store, etc.). In some examples, control circuit 112 can update status tree 116 at every or nearly every access, to point away from a most recently used way. In other words, control circuit 112 can update the status bits of status tree 116 to point to the opposite half (e.g., at each level) from the most recently used way, in order to track a pseudo least-recently used way. Therefore, the status bits can guarantee pointing away from the most recently used way, and depending on which nodes are updated, points to a less-recently used way (e.g., pseudo least-recently used way), which in some examples corresponds to the least-recently used way. For instance, control circuit 112 can update the status bits of status tree 116 upon a cache hit, specifically to point away from the hit way.

The PLRU cache replacement scheme generally balances the ways selected for replacement, by using binary trees that alternate between tree halves/branches at each level. For example, the sequence described with respect to FIGS. 2A-2D can result in a cache replacement sequence of "ACBD" which repeats, to generally balance each way being selected without favoring a particular way over others. However, as described herein, cache 114 can be reconfigured to make certain ways unavailable with respect to the cache replacement scheme described herein. For example, the ways can be reserved for a particular purpose (e.g., cache-as-RAM or cache-as-buffer), or otherwise not a candidate for cache replacement selection.

FIGS. 3A-3D illustrate various trees 300-303, respectively, in accordance with the PLRU cache replacement scheme described herein. Trees 300-303 can correspond to iterations of trees 200-203 and/or status tree 116 having one or more ways designated as unavailable (e.g., way "D" as illustrated in FIGS. 3A-3D with shading). Control circuit 112 can track the one or more unavailable ways in any suitable manner, such as removing appropriate mapping or otherwise restricting access.

Figure 3A:
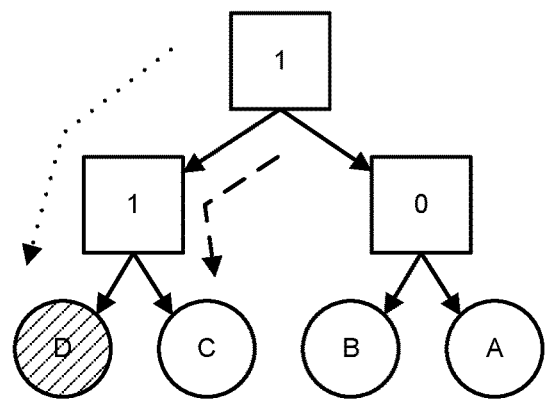
FIG. 3A-D are tree diagrams of an exemplary PLRU cache replacement scheme with a reduced number of ways.

With respect to FIGS. 2A-2C, having way "D" unavailable can be negligible for the updating of status bits. Thus, for the purposes of discussion, FIG. 3A illustrates tree 300 that can correspond to the status bits of tree 203 in FIG. 2D, after having gone through a similar sequence as in FIGS. 2A-2C. Similar to FIG. 2D, control circuit 112 can traverse tree 300 to find way "D" as the PLRU way (as indicated by the dotted arrow). However, unlike tree 203 in FIG. 2D, way "D" is unavailable for tree 300 in FIG. 3A. Control circuit 112 can find a different way, for example, by traversing back up one level, and down the opposite branch from what the status bit originally indicates, and otherwise normally traversing the rest of this opposite branch (e.g., following the rest of the status bits). Control circuit 112 can continue this search, searching an opposite half from a found unavailable way, until finding a closest available way (e.g., for larger trees). Thus, control circuit 112 can select way "C" in FIG. 3A (as indicated by the dashed arrow).

Figure 3B:
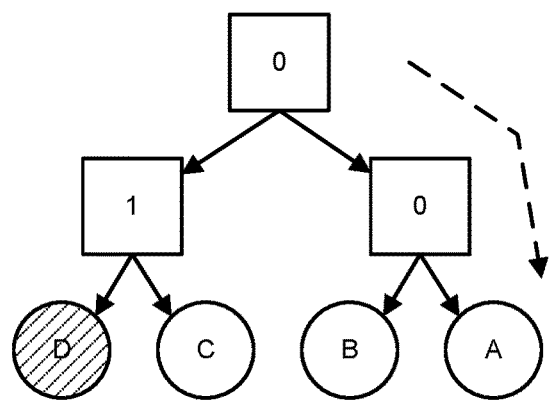

Control circuit 112 can update tree 300 to point away from way "C" (as the selected way), as reflected in tree 301 in FIG. 3B. In some examples, control circuit 112 can update tree 300 to instead point away from way "D" (as originally indicated by tree 300). Thus, continuing with FIG. 3B, control circuit 112 can select way "A" for a next cache replacement operation (e.g., based on "0" for the root node, and "0" for the next level node). Control circuit 112 can accordingly update tree 301 to point away from way "A," as reflected in tree 302 in FIG. 3C.

Figure 3C:
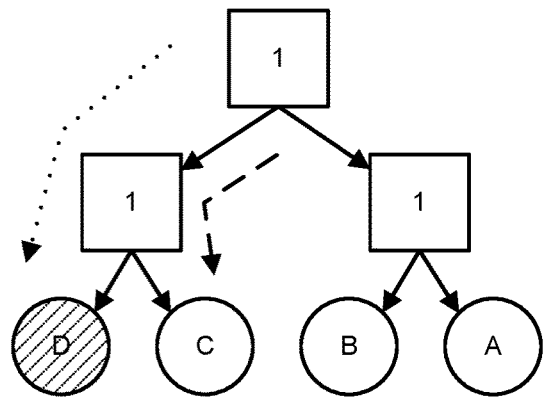

In FIG. 3C, control circuit 112 can select way "D" for a next cache replacement based on the status bits (as indicated by the dotted arrow). However, because way "D" is unavailable, control circuit 112 can instead select a next closest available way, similar to FIG. 3A, to ultimately select way "C" (as indicated by the dashed arrow). Control circuit 112 can update tree 302 to point away from way "C," as reflected in tree 303 in FIG. 3D.

Figure 3D:
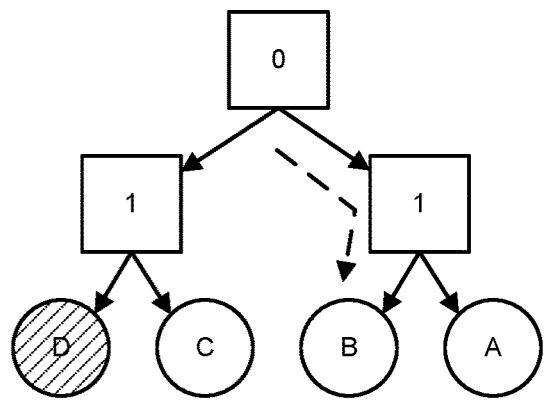

In FIG. 3D, control circuit 112 can select way "B" for a next cache replacement based on the status bits (as indicated by the dashed arrow). Control circuit 112 can accordingly update tree 303 to point away from way "B," which can result in a tree resembling tree 300 in FIG. 3A. Control circuit 112 can continue updating status tree 116 for successive cache replacements in accordance with trees 300-303 as described herein, although in some examples control circuit 112 can update status tree 116 for other cache accesses.

FIGS. 3A-3D illustrate how the PLRU scheme can continue with one or more unavailable ways. However, a resulting replacement sequence for FIGS. 3A-3D is "CACB" which repeats, such that this PLRU scheme is biased to way "C" (e.g., being selected more often than other ways) and is therefore undesirably unbalanced for the available ways. Therefore, reconfiguring cache 114 to reduce available ways for a given set can result in sub-optimal performance of a PLRU cache replacement scheme. However, the systems and methods described herein allow for reconfigured cache ways without requiring significant changes to control circuit 112 and/or status tree 116.

FIGS. 4A-4F illustrate various trees 400A-403B, respectively, in accordance with the PLRU cache replacement scheme described herein. Trees 400A-403B can correspond to iterations of status tree 116 having one or more ways designated as unavailable (e.g., way "D" as illustrated in FIGS. 4A-4F, similar to FIGS. 3A-3D). Control circuit 112 can track the one or more unavailable ways in any suitable manner as described herein.

Figure 4A:
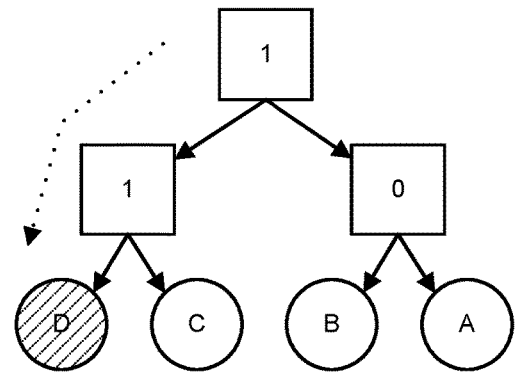
Figure 4B:
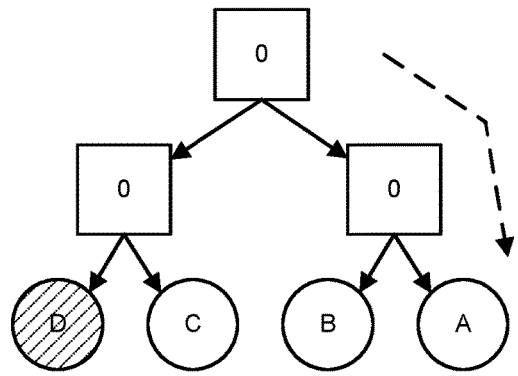

Similar to FIG. 3A, FIG. 4A illustrates tree 400A that can correspond to the status bits of tree 203 in FIG. 2D, after having gone through a similar sequence as in FIGS. 2A-2C. Similar to FIG. 3A, control circuit 112 can traverse tree 400A to find/select unavailable way "D" as the PLRU way, for example by traversing a first half down a left branch of the binary tree based on status bit "1" at a highest level or root node (as indicated by the dotted arrow). However, unlike with tree 300 in FIG. 3A, control circuit 112 can, instead of finding a next closest PLRU way, search a second half (e.g., opposite half) down the right branch of the binary tree, as illustrated in tree 400B in FIG. 4B. Control circuit 112 can therefore select way "A" for a cache replacement, as illustrated in FIG. 4B.

In some examples, control circuit 112 can be configured to search both halves of status tree 116 at the same or nearly the same time (e.g., decode the first half of status tree 116 based on the highest level status bit, and decode the second half corresponding to the opposite half of the highest level status bit). In some implementations, control circuit 112 can be configured to search both halves for every search of status tree 116 (e.g., regardless of whether the first half produces an unavailable way) such that a single search cycle can produce an available way. Accordingly, control circuit 112 can perform both searches illustrated in FIGS. 4A and 4B to find an available way.

Further, in some examples control circuit 112 can accordingly update status tree 116 after the searches. For example, control circuit 112 can update tree 400A to point away from way "D" (e.g., the PLRU indicated by the status bits), as reflected in FIG. 4B. However, because way "A" is ultimately selected, control circuit 112 can accordingly update tree 400B to point away from way "A," as reflected in tree 401 in FIG. 4C. As will be described further below, if control circuit 112 does not ultimately select the second way from the second searched half, control circuit 112 can forego updating the second half (e.g., updating only the first half to point away from the first searched way). Moreover, in some examples, as a result of updating both halves, the highest level or root node can ultimately be unchanged (e.g., being flipped twice), for instance comparing the root node values of FIGS. 4A and 4C such that in some examples, control circuit 112 can forego updating the highest level or root node.

Figure 4C:
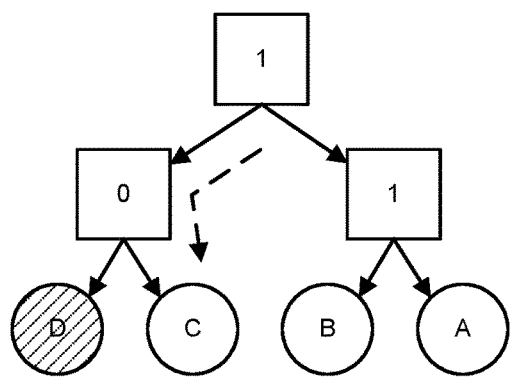

Continuing to FIG. 4C, for a next cache replacement, control circuit 112 can search tree 401 (e.g., the first or left half based on value "1" at the root node) to select way "C" based on the status bits (e.g., "1" at the root node and "0" at the next level node, as indicated by the dashed arrow). Although not illustrated in FIG. 4C, in some examples control circuit 112 can simultaneously or near-simultaneously also search the second or right half (e.g., the opposite half from what the root node indicates). However, because the first half produced an available way, in some examples control circuit 112 can discard or otherwise ignore the would-be result (e.g., way "B") from the second half. Alternatively, in some examples, control circuit 112 can use the second search and/or a part thereof for a next replacement, such as if tree 401 has not yet otherwise been updated (e.g., due to a hit), which in some instances can include buffering and/or otherwise temporarily storing the resulting way. Accordingly, control circuit 112 can update the first half to point away from selected way "C" (as reflected in tree 402 in FIG. 4D) without similarly updating the second half (e.g., when the second half result remains unused).

Moving onto FIG. 4D, control circuit 112 can, for a next cache replacement, select way "B" (e.g., based on the status bits) and accordingly update the status bits for that half (e.g., right half as indicated by the status bits) of tree 402. As also described above, control circuit 112 can also search the opposite half (e.g., the left half) without selecting from or updating that half. Updating tree 402 can result in tree 403A in FIG. 4E.

In FIG. 4E, control circuit 112 can search the first half (e.g., the left half as indicated by the status bits) of tree 403A and in FIG. 4F, control circuit 112 can search the second half (e.g., the right half) of tree 403B. Searching the first half can result in unavailable way "D" (as indicated by the dotted arrow in FIG. 4E), whereas searching the second half can result in way "A" (as indicated by the dashed arrow in FIG. 4F). Thus, control circuit 112 can select way "A," and accordingly update the trees (e.g., to point away from the first way in response to the first half search, and also to point away from the second way in response to the second half search), which can result in a tree resembling tree 401 in FIG. 4C.

FIGS. 4A-4F illustrate how the PLRU scheme described herein, with control circuit 112 searching both halves of status tree 116 upon each selection process, results in a replacement sequence of "ACB" which repeats, generally balancing each available way being selected. Configuring control circuit 112 as described herein can therefore allow minimal changes to an architecture of control circuit 112 and/or status tree 116, while allowing reconfiguration of the ways of one or more sets of cache 114, while continuing to use the PLRU cache replacement scheme (e.g., without significant changes to the PLRU cache replacement scheme). Although control circuit 112 can accordingly operate with any number of ways being designated as unavailable, in some implementations, control circuit 112 and/or status tree 116 can be further configured to better optimize searching/decoding based on a number of ways that are available (or a number of unavailable ways). For instance, although FIGS. 4A-4F illustrate simple trees (e.g., having a depth of two from the root node, with four leaves mapping to four ways), the systems and methods described herein can be applied to any other tree size/depth as needed.

Figure 5A:
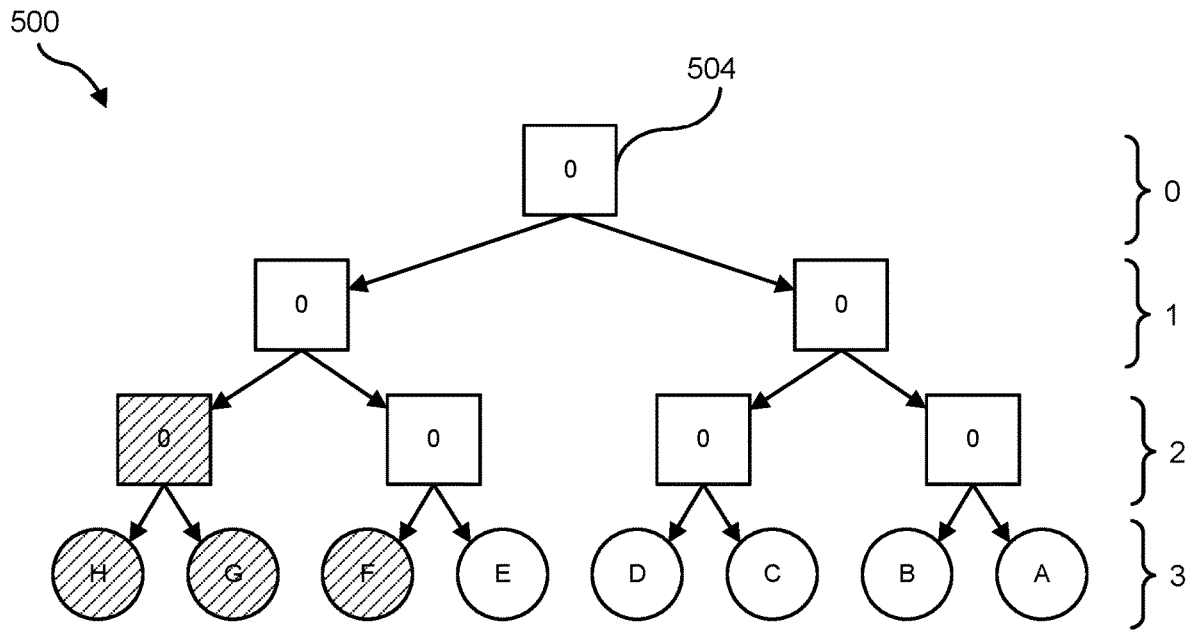
FIGS. 5A-B are tree diagrams of modified tree structures with respect to a reduced number of ways.
Figure 5B:
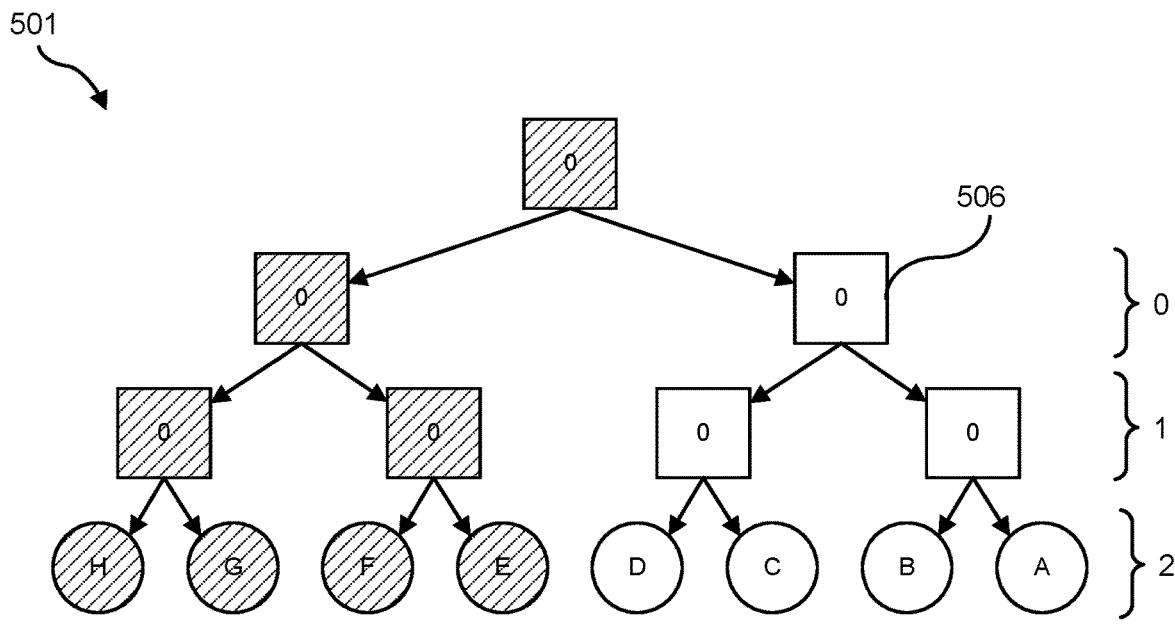

FIGS. 5A-5B illustrate various trees 500 and 501, respectively, in accordance with the PLRU cache replacement scheme described herein. Trees 500 and 501 can correspond to iterations of status tree 116, and as illustrated in FIGS. 5A-5B, can be larger (e.g., having more depth and/or leaves) than trees 400A-403B of 4A-4F. More specifically, trees 500 and 501 have a depth of three from the root node, with eight leaves mapping to eight ways (e.g., ways "A"-"H," which can be mapped to ways of cache 114 in any suitable mapping). In some examples, control circuit 112 can search status tree 116 based on a highest available node, which can be determined based on the number of available (and/or unavailable) ways.

In FIG. 5A, ways "F," "G," and "H" are unavailable, and a corresponding node for ways "G" and "H" is also shaded, as all of its branches are unavailable. However, portions of a left half of tree 500 remain unshaded (e.g., for way "E" that is available). Thus, a highest available level 504 (corresponding to a highest node in which each branch/half includes at least one available way) also corresponds to a root node of tree 500 such that control circuit 112 can begin searches with a status bit of highest available level 504.

FIG. 5B illustrates tree 501 in which ways "E," "F," "G," and "H" are unavailable. As further illustrated in FIG. 5B, nodes which only lead to unavailable ways have been shaded. In addition, because the root node has only one branch leading to available ways, a highest available level 506 corresponds to a depth of one, as illustrated in FIG. 5B. In other words, control circuit 112 can reduce search times by searching only a sub-portion of tree 501 starting at highest available level 506 (e.g., because starting at the root node, every search will necessarily require searching the described sub-portion of tree 501). Thus, control circuit 112 can search the first and second halves of tree 501 starting at highest available level 506 (e.g., using the status bit thereof).

In some examples, control circuit 112 can determine the highest available level and/or configure status tree 116 based on the number of unavailable (and/or available) ways, particularly if the unavailable ways are contiguous (e.g., extend from a same half of a binary tree). Because status tree 116 can correspond to a binary tree mapped to a number of ways corresponding to a power of two, if the number of available ways N is a power of two (N further determinable from subtracting a number of unavailable ways from a total number of ways, which is often a power of 2), a tree depth can be log 2(N). Thus, in FIG. 5B, with 4 available ways, a tree depth can be 2 (indicated by brackets). In FIG. 5A, assuming all 8 ways are available, a tree depth can be 3 (indicated by brackets).

If the number of available ways is not a power of 2, in some examples, rounding up to the next highest power of 2, and applying log 2(N) can produce the desired tree depth. Thus, in FIG. 5A, rounding up from 5 to the next highest power of 2 (e.g., 8), yields a tree depth of 3.

A highest available level can correspond to the tree depth (e.g., a sub-portion of the of the tree having the tree depth, and corresponding to a side of the tree opposite the contiguous unavailable ways). In some examples, the sub-portion of the tree can be defined by the calculated tree depth assigned to a leaf/way level of a tree, and counting down the tree depth value until reaching 0 (e.g., a new root node), and the specific node selected as the new root node of the sub-portion can correspond to a side of the tree opposite the unavailable ways. Based on this definition, a sub-portion of tree 500 in FIG. 5A can include all of tree 500 (e.g., highest available level 504 coinciding with the original root node), whereas in FIG. 5B, a sub-portion of tree 501 includes only a right branch of the original root node.

Although mathematically represented and described herein, the sub-portion determination can, in some examples, be hard coded (e.g., a particular number of available and/or unavailable ways corresponding to a particular sub-portion of the tree). Accordingly, in some implementations, control circuit 112 can be configured to search a sub-portion of status tree 116 such that decoding status tree 116 includes decoding only the relevant status bits for the sub-portion. In addition, control circuit 112 can be configured to search both halves of the sub-portion as described above. Moreover, although FIGS. 5A and 5B illustrate trees having 8 leaves (corresponding to 8 ways), in other examples, any other number of ways can be represented by the trees (e.g., 32, 64, etc.) without being restricted to a power of 2 (e.g., by building a binary tree with a next highest power of two, and treating nonexistent ways as unavailable).

Figure 6:
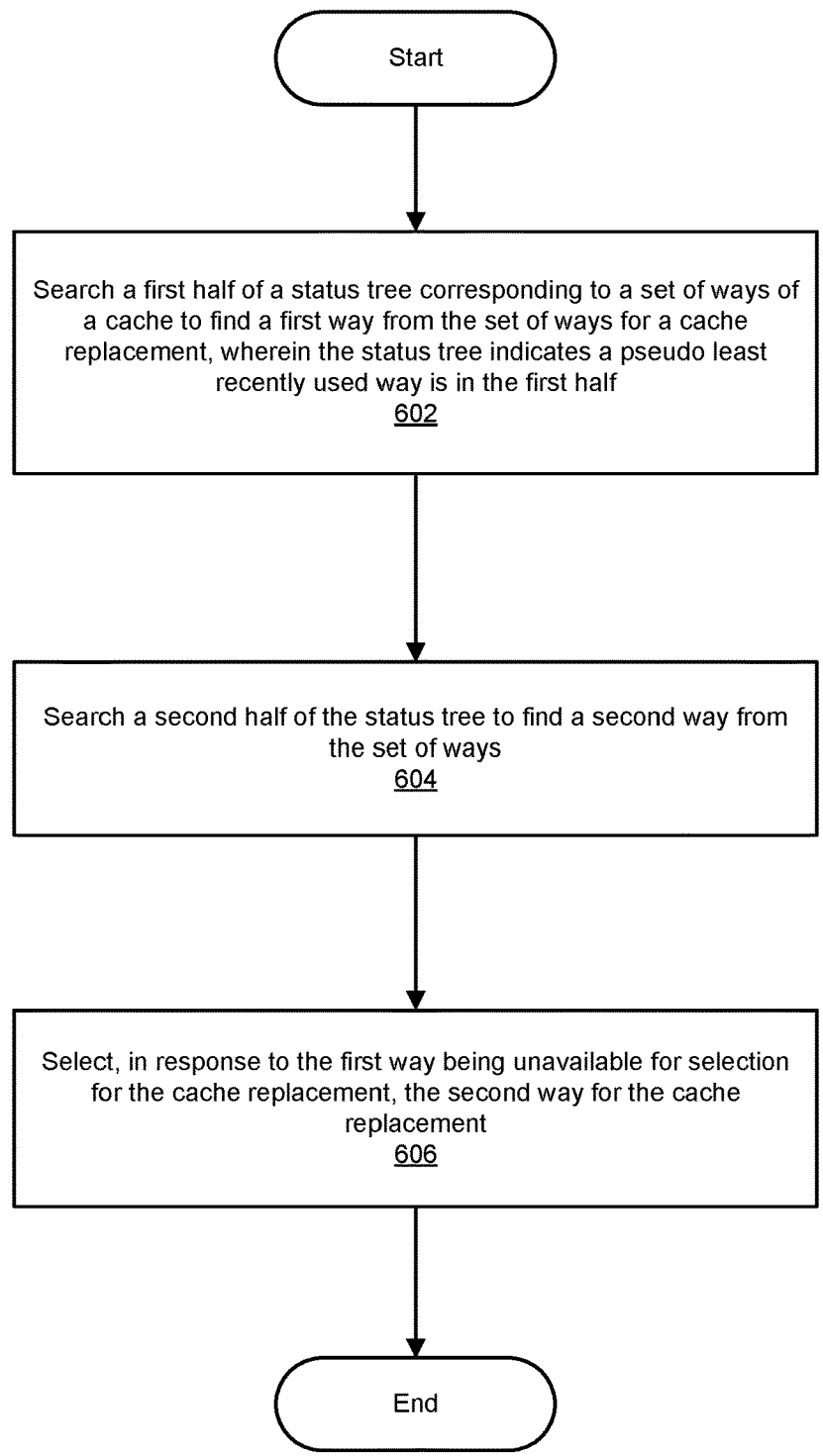
FIG. 6 is a flow diagram of an exemplary method for a configurable cache replacement scheme.

FIG. 6 is a flow diagram of an exemplary computer-implemented method 600 for a configurable cache replacement scheme. The steps shown in FIG. 6 can be performed by any suitable circuit, device, and/or computing system, including the system(s) illustrated in FIG. 1. In one example, each of the steps shown in FIG. 6 represent an algorithm whose structure includes and/or is represented by multiple sub-steps, examples of which will be provided in greater detail below.

As illustrated in FIG. 6, at step 602 one or more of the systems described herein search a first half of a status tree corresponding to a set of ways of a cache to find a first way from the set of ways for a cache replacement. The status tree can indicate a pseudo least recently used way is in the first half. For example, control circuit 112 can search a first half of status tree 116 corresponding to a set of ways for cache 114 (see, e.g., FIG. 4A).

The systems described herein can perform step 602 in a variety of ways. In one example, searching the first half can include searching a half of a sub-portion of the status tree (see, e.g., FIG. 5B). In some examples, the sub-portion of the status tree can be based on a number of available ways in the set of ways, as described herein. In some examples, control circuit 112 can update status tree 116 to point away from the first way (see, e.g., FIG. 4B).

At step 604 one or more of the systems described herein search a second half of the status tree to find a second way from the set of ways. For example, control circuit 112 can search a second half of status tree 116 (see, e.g., FIG. 4B).

The systems described herein can perform step 604 in a variety of ways. In one example, control circuit 112 can search the second half while searching the first half. In some examples, searching the second half includes searching an opposite half of the sub-portion of the status tree. In some examples, control circuit 112 can update status tree 116 to point away from the second way.

At step 606 one or more of the systems described herein select, in response to the first way being unavailable for selection for the cache replacement, the second way for the cache replacement. For example, control circuit 112 can select the second way for the cache replacement (see, e.g., FIG. 4B).

As detailed above, cache systems typically store data using a number of sets and ways. Addresses are mapped to specific sets, and ways are chosen using a replacement algorithm. An example cache system can contain 8 sets with 32 ways per set giving access to a total of 256 cache lines. Hardware cache systems typically utilize a PLRU replacement algorithm for choosing a way to replace, storing state as a binary tree.

A configurable hardware cache system (e.g., a run-time scalable cache) as described herein can be configured with a limited number of ways during operation to restrict the amount of memory associated with the cache. The system has a maximum defined number of ways that data can be stored for a given set (e.g., 32), but can be soft-limited by making a set of contiguous ways from one end of the tree unavailable.

When the number of ways is reduced, the PLRU is adapted to only select from the limited set of ways. If the number of ways is reduced to a non-power of two value, then choosing a way to evict can become problematic because the PLRU tree is no longer balanced. Thus, if a cache is scaled by altering the number of ways available, then a mechanism for reducing the number of ways available to a replacement algorithm without causing detrimental effect to the selection of ways to be replaced is desirable.

The systems and methods described herein provide a configurable PLRU tree with ability to work with a reduced number of ways by searching the PLRU tree twice and limiting the search depending on the number of unavailable ways. The implementations described herein utilize a cache which has a configurable amount of storage available to it. Under a given configuration of the cache, the number of ways and sets managed by the cache can be dependent on the available storage. In one configuration, the available number of ways available is 32. In other configurations, the number of available ways can be reduced to other non-limiting examples such as 28 or 24. As the number of ways is reduced, the PLRU algorithm needs to cope with ways that are unavailable. An unavailable way represents a way that can never be chosen in the cache replacement scheme and essentially does not exist in a given cache configuration.

The configurable PLRU cache replacement scheme described herein proposes a solution, especially in regard to configurations which contain a non-power-of-two number of ways. When performing two searches on the tree, one side is guaranteed to point to an available way. In some hardware implementations, the two searches can be performed at the same time. The two searches provide advantages including ensuring that at least one available line is discovered (and hence cycle by cycle replacement of ways can be achieved in hardware), balancing the PLRU tree such that the side of the tree with fewer available ways are not unfairly (e.g., more often) evicted due to an unbalanced tree. For instance, if the node pointing to the unavailable lines was trivially forced to always point to the available lines, then those available lines can be unfairly biased due to the inherently unbalanced tree.

Accordingly, the systems and methods herein allow for run-time configuration of the number of ways a cache system by marking ways as unavailable and traversing the PLRU tree depending on the number of ways available. By blocking off contiguous ways, and (if necessary) searching the tree twice, probabilities for selecting a node amongst the available ways is kept balanced as opposed to searching an unbalanced tree. Advantageously, there is no need to maintain separate trees for each cache configuration.

As detailed above, the computing devices and systems described and/or illustrated herein broadly represent any type or form of computing device or system capable of executing computer-readable instructions. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

Although illustrated as separate elements, the modules described and/or illustrated herein can represent portions of a single module or application. In addition, in certain implementations one or more of these modules can represent one or more software applications or programs that, when executed by a computing device, cause the computing device to perform one or more tasks. For example, one or more of the modules described and/or illustrated herein represent modules stored and configured to run on one or more of the computing devices or systems described and/or illustrated herein. In some implementations, a module can be implemented as a circuit or circuitry. One or more of these modules can also represent all or portions of one or more special-purpose computers configured to perform one or more tasks.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
a control circuit configured to:
search both a first half of a set of ways of a cache and a second half of the set of ways to select a first way from the first half and a second way from the second half using a balanced selection based on a status tree for the set of ways; and
select, in response to the first way being unavailable, the second way for a cache replacement.

2. The device of claim 1, wherein the control circuit is further configured to:
select the first way and select the second way by decoding the status tree, wherein the status tree corresponds to a binary tree for a pseudo least-recently used replacement scheme having status bits indicating which half of a level of the binary tree includes a pseudo least recently used way.

3. The device of claim 2, wherein decoding the status tree further comprising decoding the status tree for the first half while decoding status tree for the second half.

4. The device of claim 2, wherein the first half is determined from a status bit of a highest available level of the binary tree and the second half is opposite the first half.

5. The device of claim 4, wherein the highest available level is based on a number of available ways in the set of ways.

6. The device of claim 4, wherein decoding the status tree further comprises decoding a sub-portion of the binary tree starting from the highest available level.

7. The device of claim 1, wherein the control circuit is further configured to update the status tree for the first half after selecting the first way.

8. The device of claim 7, wherein updating the status tree after selecting the first way comprises updating the status tree to point away from the first way.

9. The device of claim 7, wherein the control circuit is further configured to update the status tree for the second half after selecting the second way.

10. The device of claim 9, wherein updating the status tree after selecting the second way comprises updating the status tree to point away from the second way.

11. A system comprising:
a processor;
a memory;
a cache of the processor corresponding to the memory, the cache having a set of ways mapped to a status tree, the set of ways including at least one unavailable way that is unavailable for selection in a cache replacement scheme; and
a control circuit configured to:
search both a first half of the set of ways and a second half of the set of ways to select a first way from the first half and a second way from the second half using a balanced selection based on the status tree;
update the status tree to point away from the first way; and
select, in response to the first way being unavailable, the second way for a cache replacement.

12. The system of claim 11, wherein the control circuit is further configured to:
select the first way and select the second way by decoding the status tree for the first half while decoding the status tree for the second half, wherein the status tree corresponds to a binary tree for a pseudo least-recently used (PLRU) replacement scheme having status bits indicating which half of a level of the binary tree includes a pseudo least recently used way.

13. The system of claim 12, wherein the first half is determined from a status bit of a highest available level of the binary tree.

14. The system of claim 13, wherein the highest available level is based on a number of unavailable ways in the set of ways.

15. The system of claim 13, wherein decoding the status tree further comprises decoding a sub-portion of the binary tree starting from the highest available level.

16. The system of claim 11, wherein the control circuit is further configured to update, after selecting the second way, the status tree for the second half to point away from the second way.

17. A method comprising:
searching a first half of a status tree corresponding to a set of ways of a cache to find a first way from the set of ways for a cache replacement, wherein the status tree indicates a pseudo least recently used way is in the first half;
searching, concurrently to searching the first half, a second half of the status tree to find a second way from the set of ways; and
selecting, in response to the first way being unavailable, the second way for the cache replacement.

18. The method of claim 17, further comprising searching the second half while searching the first half.

19. The method of claim 17, wherein:
searching the first half comprises searching a half of a sub-portion of the status tree;
searching the second half comprises searching an opposite half of the sub-portion of the status tree; and
the sub-portion of the status tree is based on a number of available ways in the set of ways.

20. The method of claim 17, further comprising:
updating the status tree to point away from the first way; and
updating the status tree to point away from the second way.

* * * * *